United States Patent [19]

Spatafora

[11] Patent Number: 5,607,042
[45] Date of Patent: Mar. 4, 1997

[54] INTEROPERATIONAL STORE

[75] Inventor: Mario Spatafora, Bologna, Italy

[73] Assignee: Azionaria Costruzioni Macchine Automatiche A.C.M.A. S.p.A., Bologna, Italy

[21] Appl. No.: 356,874

[22] Filed: Dec. 15, 1994

[30]     Foreign Application Priority Data

Dec. 17, 1993  [IT]  Italy .................. BO93A0509

[51] Int. Cl.⁶ ................................. B65G 37/00
[52] U.S. Cl. ........................................ 198/347.3
[58] Field of Search ........................... 198/347.3

[56]           References Cited

U.S. PATENT DOCUMENTS 3,869,115  3/1975  Barkley ................ 198/347.3 X
4,254,858  3/1981  Seragnoli ................ 198/347.3
4,349,096  9/1982  Thamerus ................ 198/347.3
4,429,779  2/1984  Hinchcliffe ............ 198/347.3

*Primary Examiner*—David A. Bucci
*Attorney, Agent, or Firm*—Ladas & Parry

[57]            ABSTRACT

A product store wherein the products are supported on a helical strip, the turns of which are rotated about a central axis and deformed elastically between an extended maximum-store-capacity position and a packed position; the turns being connected to an adjusting device for varying the spacing of the turns of the helical strip as required within a given range.

14 Claims, 6 Drawing Sheets

5,607,042

INTEROPERATIONAL STORE

BACKGROUND OF THE INVENTION

The present invention relates to an interoperational store.

U.S. Pat. No. 4,254,858 relates to an interoperational store comprising a helical belt wound about a fixed central cylindrical drum which presents a central axis coaxial with the axis of the helical belt, and an outer helical guide groove engaged in sliding manner by the inner periphery of at least part of the helical belt. The helical belt is connected to a drive device by which it is rotated about the central axis of the cylindrical drum so as to engage a longer or shorter portion of the helical groove, and flex axially between a minimum capacity position, wherein all the turns of the helical belt are free of the helical groove and packed against one another, and a maximum capacity position, wherein all the turns are distended, are equally spaced along the central drum, and engage the helical groove.

A drawback of the above known store is the equal axial spacing of the turns of the helical belt, which means the store is only economically feasible for loose products small enough to be stacked in layers between adjacent turns of the belt, or for products of a maximum size approximately equal to but no larger than the spacing of the belt.

SUMMARY OF THE INVENTION

It is an object of the present invention to provide an interoperational store designed to overcome the above drawback.

According to the present invention, there is provided an interoperational store comprising plate supporting means for products, the supporting means presenting a supporting surface of variable size and comprising a helical strip in turn comprising a variable number of turns wound about a central axis; guide means connected to the helical strip and for guiding the turns in the strip along a helical path with a given spacing; and drive means for rotating the helical strip about said central axis to vary the number of said turns located along said path; characterized in that it also comprises adjusting means associated with said guide means, for adjusting said spacing as required within a given range.

According to a preferred embodiment of the above store, the turns of the helical strip are elastically deformable, by said drive means, along said central axis and between an extended position, wherein substantially all the turns are located along said helical path, and a packed position wherein only a first turn at least partially engages the helical path.

In the above store, said central axis preferably extends vertically; the turns, in use, traveling upwards along said helical path as of said packed position.

The above store preferably also comprises a loading-unloading station located at one end of said helical path adjacent to a pack of turns defined by said turns in the packed position.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
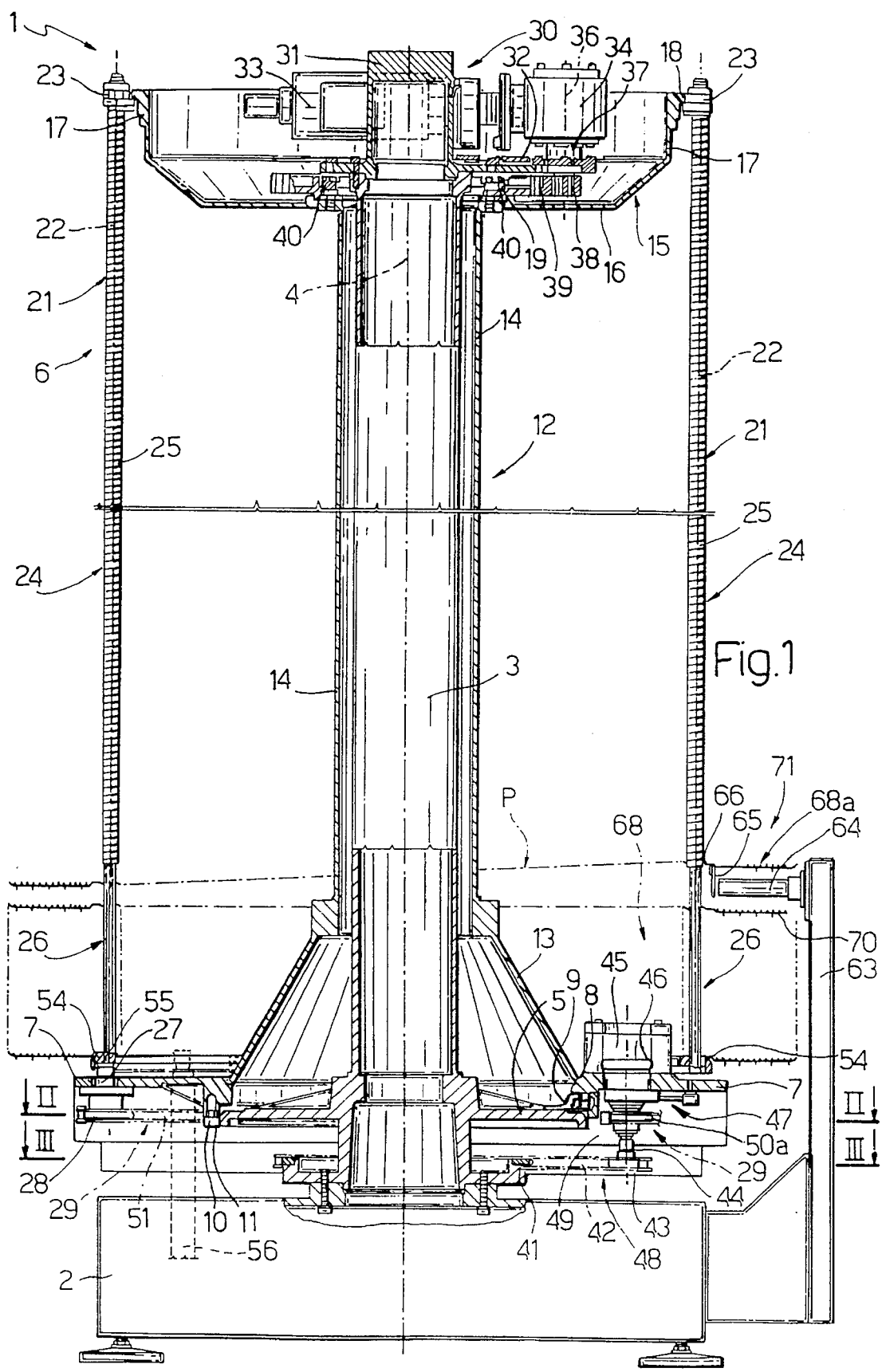
FIG. 1 shows a side view, with parts in section and parts removed for clarity, of a preferred embodiment of the store according to the present invention.

Number 1 in FIG. 1 indicates an interoperational store.

Store 1 comprises a base 2 supporting a fixed column 3 extending upwards from base 2 along a substantially vertical central axis 4. Close to its own base, column 3 presents an annular flange 5 extending radially outwards from column 3 and supporting a carrousel fixture 6 rotating about axis 4. More specifically, fixture 6 comprises an annular base 7 extending over and outwards of flange 5, and connected to flange 5 by means of a number of first radial rollers 8 interposed between base 7 and a peripheral portion of the upper surface 9 of flange 5, and by means of a number of second axial rollers 10 interposed between base 7 and the cylindrical outer surface 11 of flange 5.

Fixture 6 also comprises a tubular upright 12 extending coaxially with axis 4, housing a central portion of column 3, and in turn comprising a truncated-cone-shaped bottom portion 13 with its wider end connected integral with the inner periphery of base 7, and a cylindrical top portion 14 extending upwards from the narrower end of portion 13. Fixture 6 also comprises a housing 15 coaxial with axis 4 and in turn comprising an annular bottom wall 16 connected integral with the top end of portion 14 of upright 12 and extending crosswise to axis 4, and a substantially cylindrical wall 17 extending upwards from the outer periphery of wall 16 and presenting an outer annular flange 18 on its free end. Housing 15 also comprises a cylindrical appendix 19 (FIG. 6) extending upwards from the inner periphery of wall 16 and presenting an inner cylindrical surface 20 coaxial with axis 4.

Fixture 6 also comprises a number of rods 21 which, in the example shown, are eight in number, extend along respective axes 22 parallel to axis 4, are equally spaced about axis 4, and are supported for rotation by flange 18 via the interposition of bearings 23. Each rod 21 comprises a top portion 24 presenting a thread 25 and extending over substantially the entire length of portion 14 of upright 12; and a cylindrical, externally-smooth bottom portion 26, the bottom portion of which engages in rotary manner a respective hole 27 through base 7, and is fitted with a gear 28 for a chain drive 29 described in more detail later on.

Figure 6:
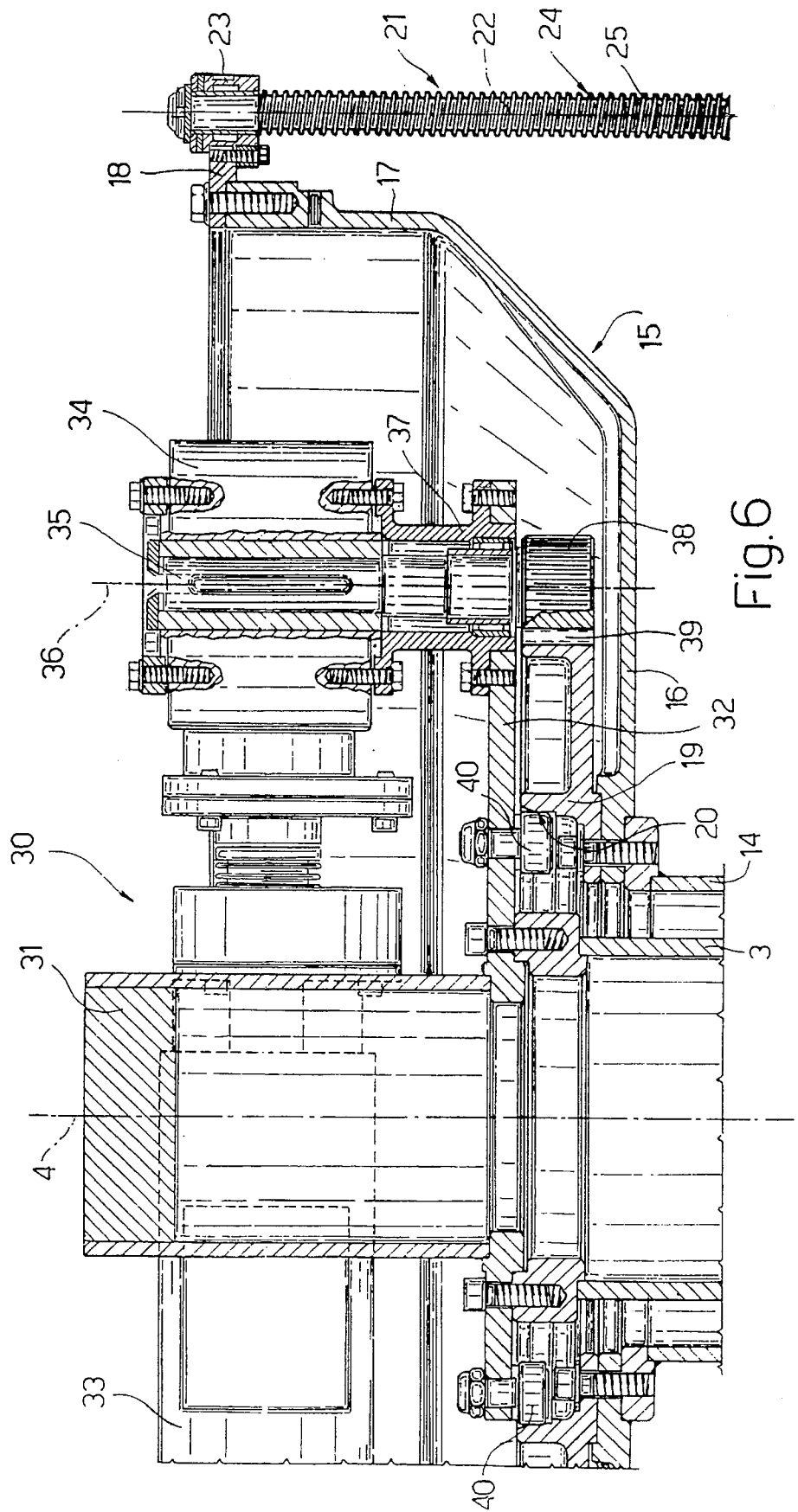
FIG. 6 shows a larger-scale view of a third detail in FIG. 1.

Fixture 6 is rotated about its axis 4 by a drive device 30 which, as shown more clearly in FIG. 6, is housed inside housing 15 and supported by a tubular top portion 31 of column 3 extending above bottom wall 16 of housing 15, and by a bracket 32 extending crosswise to axis 4 from the bottom end of top portion 31. Device 30 comprises a reversible electric motor 33 with its axis substantially crosswise to axis 4, and connected by a known drive (not shown) to a reduction gear 34, the output shaft 35 of which presents a rotation axis 36 substantially parallel to axis 4. Shaft 35 engages in rotary manner a bush 37 supporting reduction gear 34 on bracket 32, and is fitted with a pinion 38 on the opposite side of bracket 32 to reduction gear 34. Pinion 38 meshes with a ring gear 39 coaxial with axis 4 and integral with appendix 19, the surface 20 of which constitutes a rolling surface for rollers 40 fitted to bracket 32 and equally spaced about axis 4.

Figure 2:
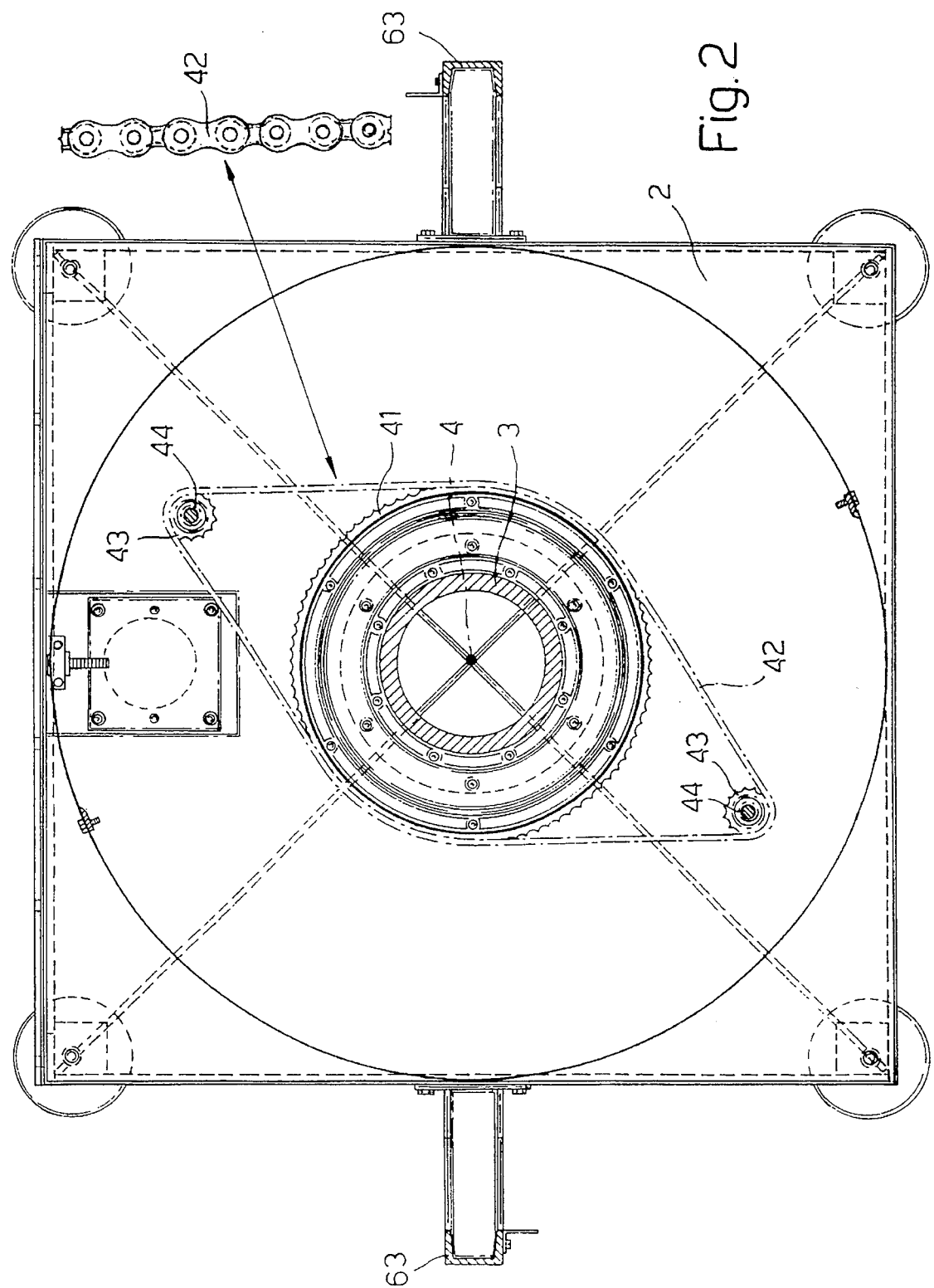
FIG. 2 shows a larger-scale section along line II—II in FIG. 1.
Figure 5:
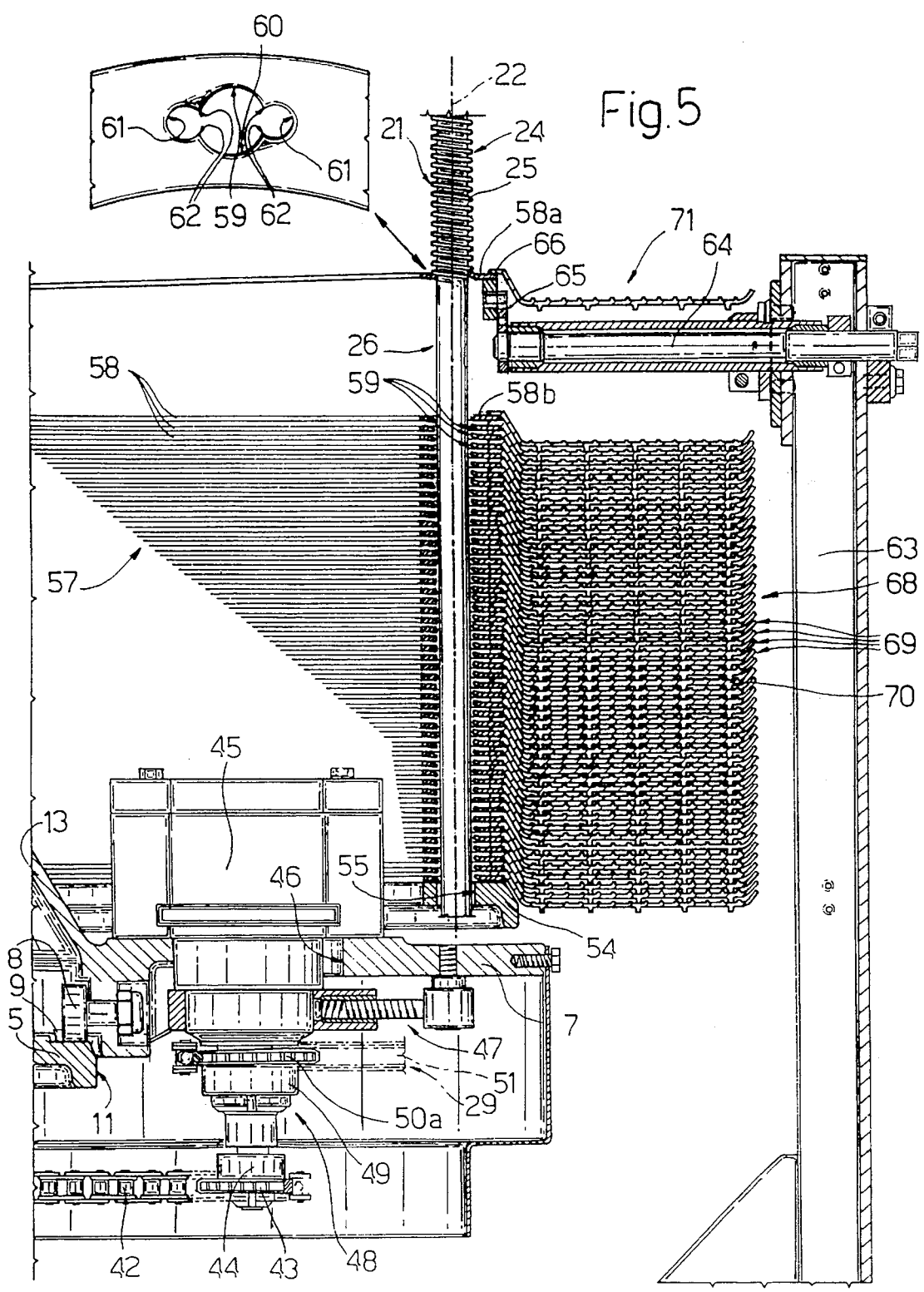
FIG. 5 shows a larger-scale view of a second detail in FIG. 1.

As shown more clearly in FIG. 2, the bottom portion of column 3 extending between flange 5 and base 2 is fitted integral with a fixed ring gear 41 coaxial with axis 4 and engaged by a chain 42 looped about two pinions 43 diametrically opposed in relation to axis As shown in FIG. 5, each pinion 43 is fitted to the input shaft 44, parallel to axis 4, of a respective reduction gear 45 supported on base 7 and fitted in radially slack manner through a respective axial hole 46 formed through base 7. The position of reduction gear 45 inside respective hole 46 is adjusted by a screw-nut screw device 47 fitted to base 7 and arranged radially in relation to axis 4.

Each reduction gear 45 is a variable velocity ratio type, and, together with ring gear 41, chain 42, pinions 43 and drive 29, constitutes an adjusting device 48 for rotating all of rods 21 about respective axes 22 with a velocity ratio adjustable as required in relation to rotation of fixture 6 about axis 4. For this purpose, each reduction gear 45 presents a tubular output shaft 49 coaxial with respective shaft 44 and fitted with a respective pinion 50a forming part of drive 29.

Figure 3:
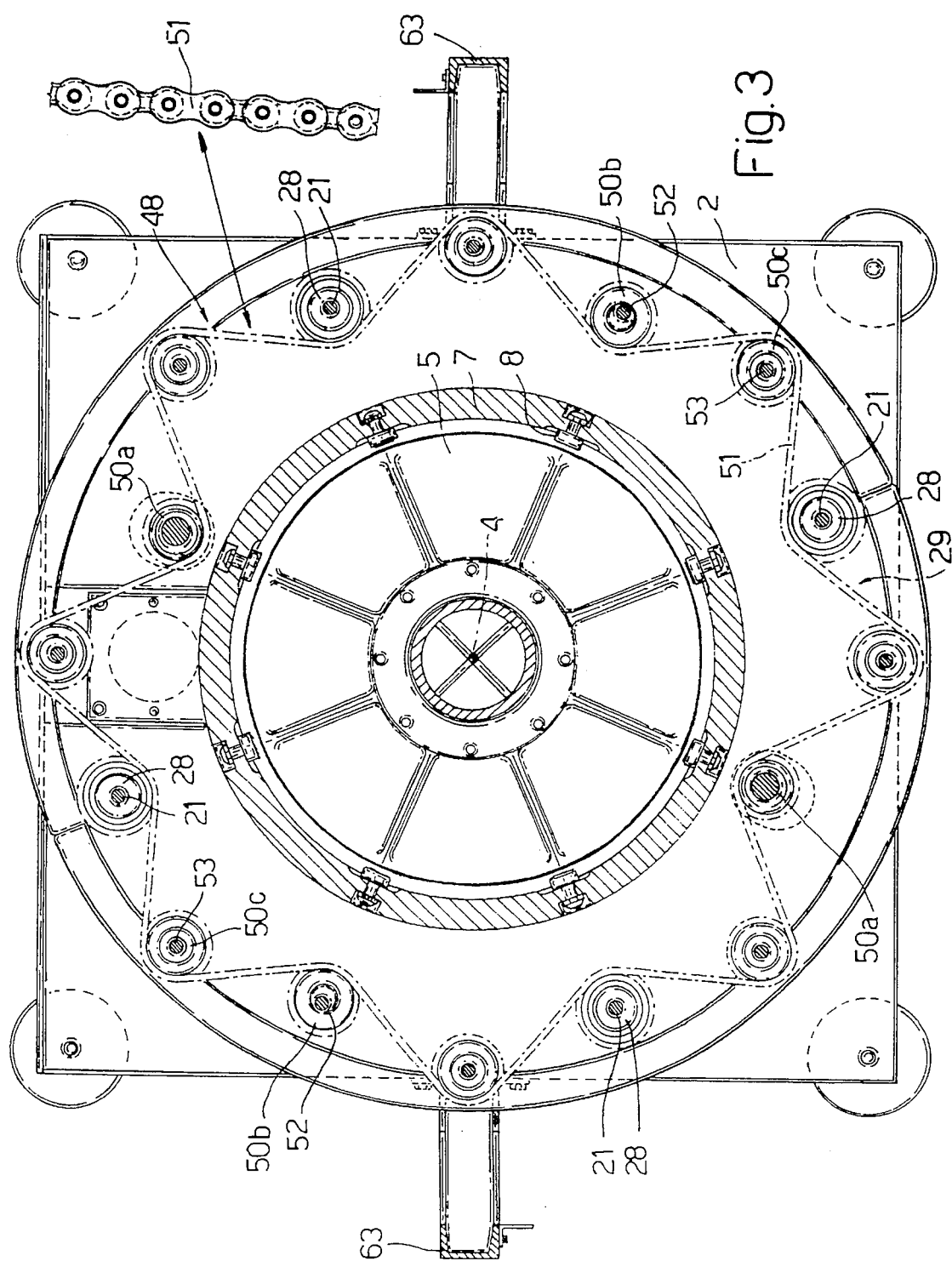
FIG. 3 shows a larger-scale section along line III—III in FIG. 1.

As shown more clearly in FIG. 3, in addition to gears 28, drive 29 also comprises an endless chain 51 wound about gears 28 and about a number of pinions 50 alternating with gears 28 so that chain 51 extends along a substantially sinusoidal path about axis 4. In addition to the two pinions 50a which act as chain tensioners by means of respective devices 47, pinions 50 also comprise two chain tensioning pinions 50b which are supported on base 7 in diametrically opposed positions in relation to axis 4, are shifted 90° in relation to pinions 50a, and are fitted in angularly adjustable manner to respective eccentric shafts 52 parallel to axis 4 and supported on base 7.

Figure 4:
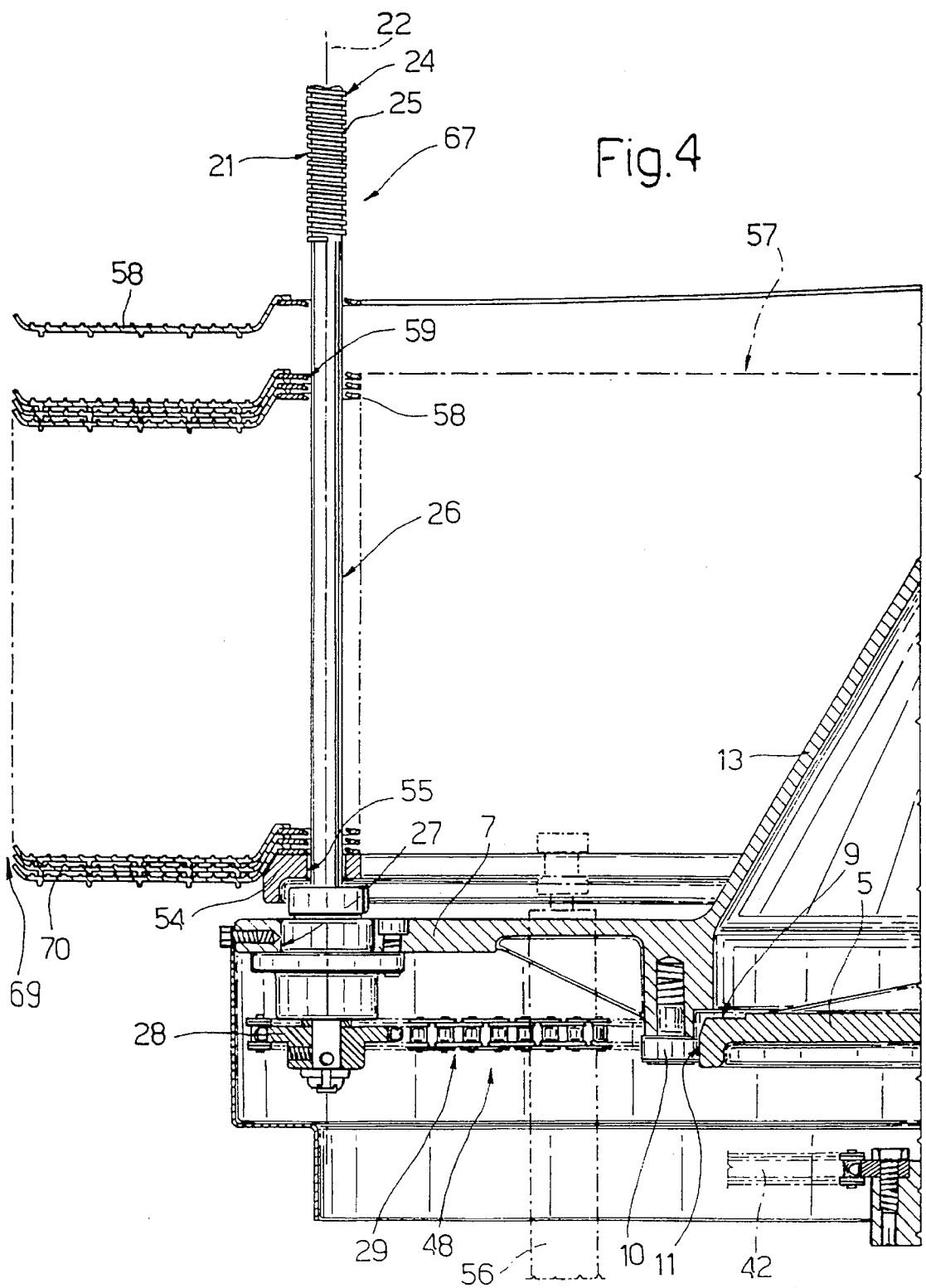
FIG. 4 shows a larger-scale view of a first detail in FIG. 1.

As shown more clearly in FIGS. 4 and 5, rods 21 are fitted in sliding manner with an annular plate 54 located immediately above base 7 and presenting, for each rod 21, a through hole 55 engaged in sliding manner by portion 26 of respective rod 21. Plate 54 is movable to and from a bottom position adjacent to base 7 by a known actuating device 56 operating in a direction parallel to axis 4, and supports a first helical strip 57, each turn 58 of which presents a number of through holes 59 equal in number to and engaged by respective rods 21. As shown in FIG. 5, each hole 59 comprises a circular central portion 60 of a diameter smaller than the pitch diameter of thread 25 and approximately equal to but no smaller than the diameter of portion 26, and presenting two lateral, diametrically opposed lobes 61, the portions of which intersecting portion 60 are bent transversely to strip 57 to define respective inner thread portions of a nut screw 62 engageable with thread 25.

As shown more clearly in FIG. 5, store 1 comprises two outer uprights 63 (only one shown) integral with and diametrically opposed in relation to base 2. Each upright 63 is fitted through in rotary manner with a radial pin 64 adjustable and lockable in position about its axis, and which, on its free end facing fixture 6, supports a crank 65 in turn supporting in rotary manner a wheel 66, the axis of which is located radially in relation to axis 4 and substantially on a level with the bottom end of portions 24 of rods 21.

Rods 21, and more specifically portions 24 of rods 21, define a guide device 67 connected to strip 57 for guiding turns 58 along a helical path P with a given spacing and extending along the portion of axis 4 corresponding to portions 24 of rods 21. More specifically, by means of drive and adjusting devices 30 and 48, turns 58 of strip 57 are elastically deformable, along axis 4, between an extended position (not shown) wherein substantially all of turns 58 are located along path P, and a packed position (shown in FIGS. 4 and 5) wherein only a first turn 58a at least partially engages path P, and rests on top of wheels 66 with holes 59 engaging threads 25, while the other turns 58 are packed along portions 26 of rods 21 to form a pack 68 on plate 54 which provides for raising pack 68 so that the top turn 58b is always the same distance from the bottom end of threaded portions 24 of rods 21.

The outer peripheral portion of each turn 58 of strip 57 supports the inner peripheral portion of a respective turn 69 of a second helical strip 70 projecting outwards of strip 57 and for supporting a succession of products (not shown) which are loaded on to (or unloaded off) strip 70 at a loading-unloading station 71 at one of the two pins 64.

In actual use, when motor 33 of drive device 30 is operated, pinion 38 is rotated in one direction or the other and, meshing with ring gear 39, rotates fixture 6 and hence rods 21 and reduction gears 45 in a given direction about axis 4; and, as chain 42 meshes with fixed ring gear 41, rotation of reduction gears 45 about axis 4 automatically causes chain 42 to roll about ring gear 41, and pinions 43 to roll along chain 42. In other words, chain 42 acts as a rack, and rotation of reduction gears 45 about axis 4 in one direction causes pinions 43 to rotate about their axes in the opposite direction. As such, input shaft 44 of each reduction gear 45 makes a given "n" number of turns for each complete turn of fixture 6 about axis 4, while the output shaft 49 of the same reduction gear 45 makes "m" number of turns about its axis, the value of "m" depending on the adjustable velocity ratio set by the user.

Rotation of shafts 49 and respective pinions 50a is transmitted to chain 51 of drive 29 and hence to gears 28 which make "w" number of turns about axis 22 for each turn of fixture 6; which "w" value only differs from "m" in the event the number of teeth of gears 28 differs from that of pinions 50a.

In other words, each turn of fixture 6 about axis 4 corresponds to one turn of rods 21 about axis 4, and to "w" turns of rods 21 about respective axes 22; the "w" value being adjustable as required with a given range by adjusting the velocity ratio of reduction gears 45.

Consequently, for each turn of fixture 6 about axis 4, the turns 58 whose holes 59 engage the threaded portions 24 of rods 21 are moved in one direction or the other, depending on the rotation direction of fixture 6, by a distance S equal to the product "sw", where "s" is the pitch of threads 25, and "S" is the spacing of helical path P. By simply adjusting the velocity ratio of reduction gears 45, therefore, spacing "S" may be set by the user as a function of the type and size of the products (not shown) for storage.

For each full turn of fixture 6 about axis 4, a turn 58 is wound off or on to pack 68, and at the same time, plate 54 is respectively raised or lowered by actuating device 56 by a distance equal to the pitch of turns 58 in pack 68, so that turn 58b is always the same distance from adjacent turn 58a engaging threads 25.

According to a variation not shown, strips 57 and 70 are integral with each other to form one helical strip. The embodiment shown, however, is more advantageous in that forming strips 57 and 70 separately enables supply of a standard machine featuring only strip 57 and a structure independent of the type and size of the products for storage, and the addition of a strip 70 specially designed in terms of shape, material and size for the products being stored.

I claim:

1. An interoperational store (1) comprising:

supporting means for supporting products, the supporting means comprising a helical strip (70) having a variable number of turns (69) about a central axis (4);

guide means (67) connected to the helical strip (70) for guiding the turns (69) of the helical strip (70) along helical paths (P) with spacings (S) between successive ones of the turns;

drive means (30) for rotating the helical strip (70) about the central axis (4) to vary the number of the turns (69) along the helical paths (P); and adjusting means (48) associated with the guide means (67) for adjusting the spacings (S) over a given range.

2. A store as claimed in claim 1, characterized in that the turns (69) of the helical strip (70) are elastically deformable, by said drive means (30), along said central axis (4) and between an extended position wherein substantially all the turns (69) are located along said helical paths (P), and a packed position wherein only a first turn at least partially engages said helical paths (P).

3. A store as claimed in claim 2, characterized in that said central axis (4) extends vertically; the turns (69), in use, traveling along said helical paths (P) to and from said packed position.

4. A store as claimed in claim 2, characterized in that it comprises a loading-unloading station (71) located at one end of said helical paths (P), adjacent to a pack (68) of turns (69) defined by the helical strip (70) in the packed position.

5. A store as claimed in claim 1, characterized in that said guide means (67) comprise at least one rod (21) substantially parallel to said central axis (4) and defining a guide for guiding said turns (69) to and from the packed position; said drive means (30) being connected to said rod (21) for rotating it about said central axis (4).

6. A store as claimed in claim 5, characterized in that it comprises a further helical strip (57) in turn comprising a number of further turns (58) wound about and elastically deformable along said central axis (4); said further turns (58) each presenting a through hole (59) engaged by said rod (21), and each supporting a respective said turn (69); and said adjusting means (48) being operable for adjusting the spacing (S) of said further turns (58).

7. A store as claimed in claim 6, characterized in that said adjusting means (48) comprise an external thread (25) formed along a first portion (24) of said rod (21) intersecting one said path (P); a nut screw (62) formed in each said hole (59) and engaged by said thread (25); and actuating means (41, 42, 43, 45, 29) for rotating the rod (21) about its longitudinal axis (22); said actuating means (41, 42, 43, 45, 29) comprising an adjustable drive device (45) for imparting to the rod (21) a variable angular speed, so that the rod (21) makes a variable number (w) of turns about its longitudinal axis (22) for each turn of the rod (21) about said central axis (4).

8. A store as claimed in claim 7, characterized in that said rod (21) comprises an externally smooth second portion (26) engaging in sliding manner said holes (59).

9. An interoperational store (1) comprising:

supporting means for supporting products, the supporting means comprising a first helical strip (70) having a variable number of first turns (69) about a central axis (4);

guide means (67) connected to the first helical strip (70) for guiding the first turns (69) along helical paths (P) with first spacings (S) between successive ones of the first turns;

drive means (30) for rotating the first helical strip (70) about the central axis (4) to vary the number of the first turns (69) along the helical paths (P); and adjusting means (48) associated with the guide means (67) for varying the first spacings (S) over a given range, the guide means comprising a second helical strip (70) having a number of second turns (58) about and elastically deformable along the central axis (4), the second turns (58) supporting the first turns (69) and defining the helical paths (P), the adjusting means (48) being operable for varying second spacings of the second turns (58).

10. A store as claimed in claim 9, characterized in that the first (69) and second (58) turns are elastically deformable, by said drive means (30), along said central axis (4) and to and from a packed position wherein only a first turn at least partially engages said helical paths (P).

11. A store as claimed in claim 9, characterized in that said guide means (67) also comprise at least one rod (21) substantially parallel to said central axis (4) and defining a guide for guiding said second turns (58) to and from the packed position; said drive means (30) being connected to said rod (21) for rotating it about said central axis (4).

12. A store as claimed in claim 9, characterized in that the second turns (58) each present a through hole (59) engaged by said rod (21), and each support a respective said first turn (69); said adjusting means (48) being operable for adjusting the second spacing of said second turns (58).

13. A store as claimed in claim 12, characterized in that said adjusting means (48) comprise an external thread (25) formed along a first portion (24) of said rod (21) intersecting one said path (P); a nut screw (62) formed in each said hole (59) and engaged by said thread (25); and actuating means (41, 42, 43, 45, 29) for rotating the rod (21) about its longitudinal axis (22); said actuating means (41, 42, 43, 45, 29) comprising an adjustable drive device (45) for imparting to the rod (21) a variable angular speed, so that the rod (21) makes a variable number (w) of turns about its longitudinal axis (22) for each turn of the rod (21) about said central axis (4).

14. A store as claimed in claim 13, characterized in that said rod (21) comprises an externally smooth second portion (26) engaging in sliding manner said holes (59).

* * * * *